Sept. 29, 1925.

B. M. ELY 1,555,463

GRINDING MACHINE

Filed July 24, 1924   2 Sheets-Sheet 2

Inventor.
Bernard M. Ely,
By Ogmsforth, Lee, Chritton & Wiles
Attys.

Patented Sept. 29, 1925.

1,555,463

UNITED STATES PATENT OFFICE.

BERNARD M. ELY, OF MARSHALL, MICHIGAN, ASSIGNOR TO LAMBERT MACHINE COMPANY, OF MARSHALL, MICHIGAN, A CORPORATION OF MICHIGAN.

GRINDING MACHINE.

Application filed July 24, 1924. Serial No. 728,014.

*To all whom it may concern:*

Be it known that I, BERNARD M. ELY, a citizen of the United States, residing at Marshall, in the county of Calhoun and State of Michigan, have invented a new and useful Improvement in Grinding Machines, of which the following is a specification.

This invention relates to improvements in grinding machines and is here shown embodied in a machine especially adapted for breaking roasted whole coffee berries, in such quantities and in such proportions as may be desired to conform with the capacity of the finishing burrs to which the broken coffee is fed. Although the device here shown is especially adapted for breaking coffee berries, it is evident that, without detracting from the spirit of my invention, the same may be embodied in machines for handling other materials besides coffee berries.

Figure 1:
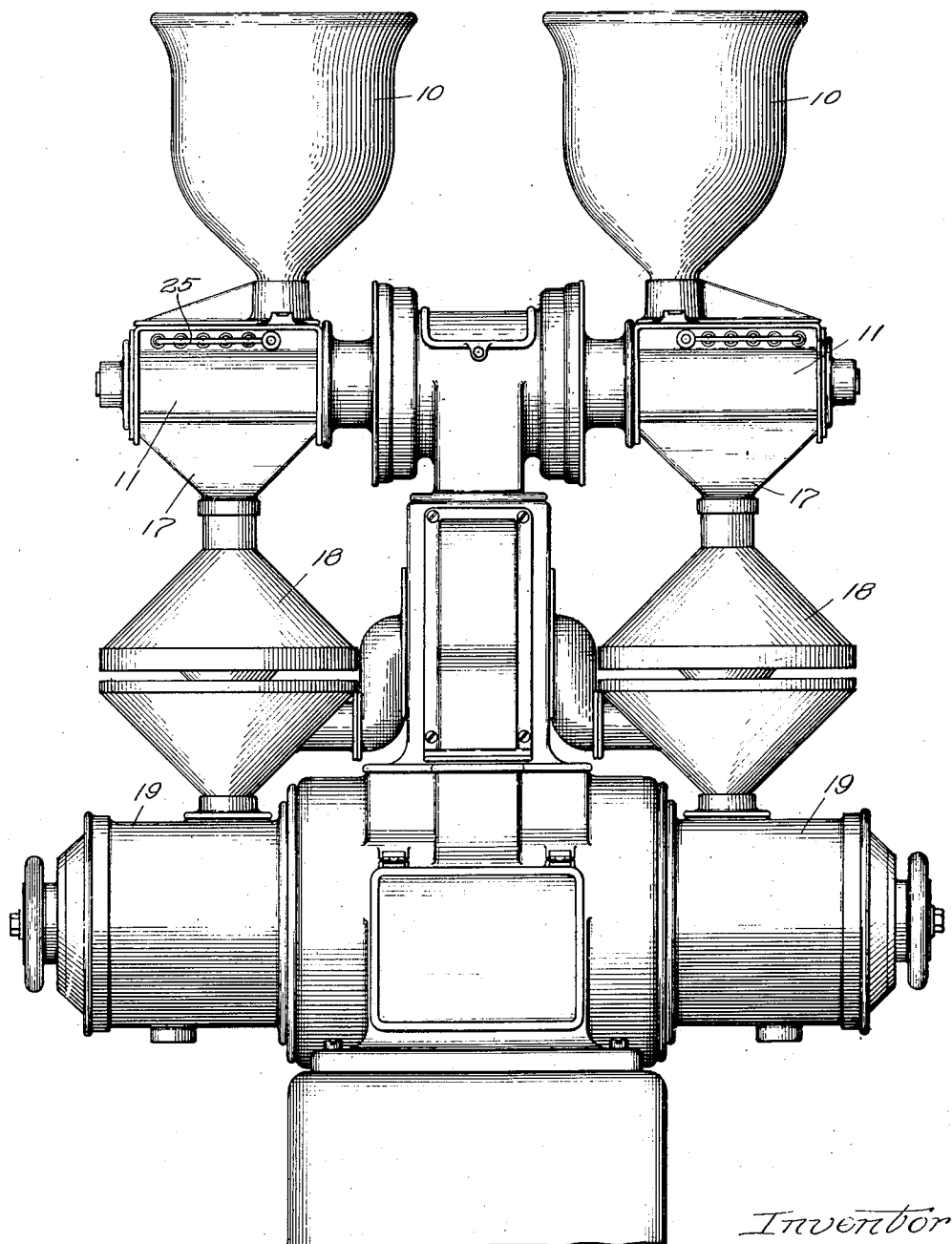
Figure 2:
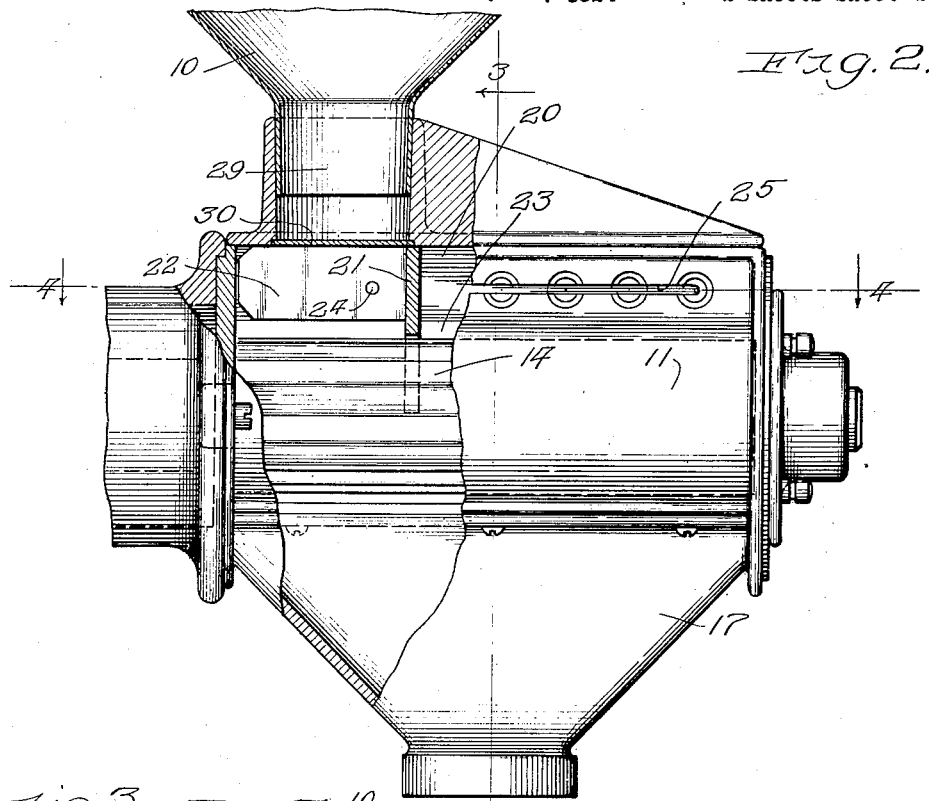
Figure 3:
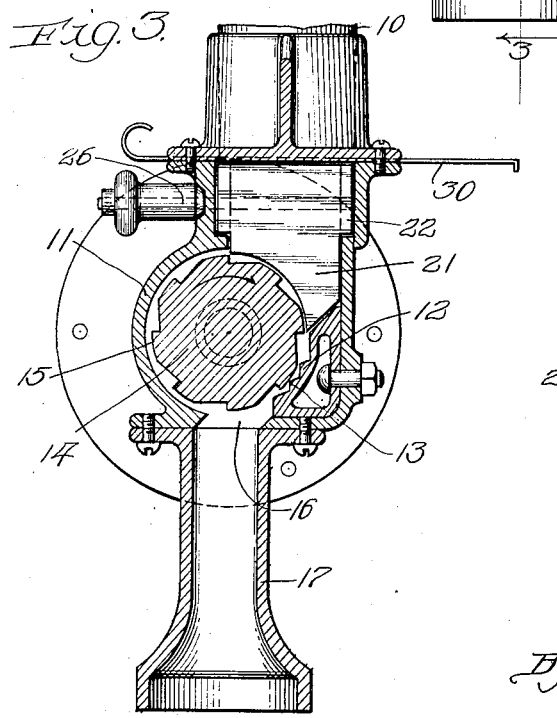
Figure 4:
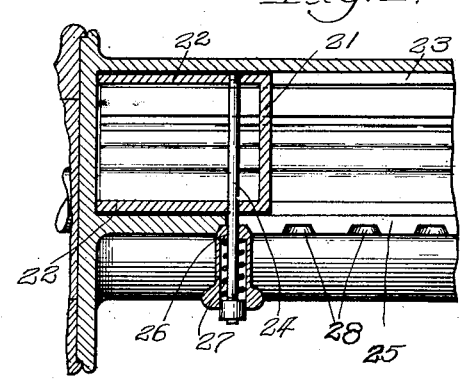

In that form of device embodying the features of my invention shown in the accompanying drawings, Figure 1 is a view in front elevation of a complete coffee grinding machine, Fig. 2 is a view partly in vertical section showing the breaking mechanism, Fig. 3 is a view taken as indicated by the line 3—3 of Fig. 2, and Fig. 4 is a view taken as indicated by the line 4—4 of Fig. 2.

As shown in the drawings, the grinding machine is made duplex, being virtually two machines operated by one driving mechanism. Since the two sides of the machine shown in Fig. 1 are similar, we will describe in detail but one.

10 indicates a hopper adapted to hold the coffee berries to be fed into the machine. Below the hopper is arranged an elongated casing 11, to the inside wall of which is attached a stationary elongated horizontal breaker 12 provided with longitudinal parallel teeth or ridges 13. Inside of the casing 11 there is also rotatably mounted the cylindrical revolving breaker 14 provided with suitable flutes or teeth 15 adapted to cooperate with the teeth 13 on the stationary breaker in such a manner as to break the coffee berries only sufficiently to release the chaff, or silver skin which is on the inside of the berries. The direction of rotation of the rotatable breaker 14 is indicated by the arrow in Fig. 3.

The bottom of the casing 11 is provided with a longitudinal opening 16 through which the broken coffee and chaff are discharged into the flattened funnel-shaped member 17 whence they are fed into the chaff remover 18.

The details of construction of the chaff remover 18 form the subject matter of a copending application, and consequently the same will not be described in detail here.

From the chaff remover, the broken coffee berries are fed into the cylindrical casing 19 in which operate the grinding burrs which cut the coffee to the desired degree of fineness. The details of the grinding burrs also form the subject matter of a copending application and consequently will not be described in this case.

Suitable driving means are provided for rotating the cylindrical breaker 14, but such driving means form no part of the present invention and consequently are not described or claimed herein.

Within the casing 11 above the rotatable breaker 14 and slightly to one side there is provided an elongated chamber or open space 20 extending substantially the entire length of the casing. Slidably mounted within this chamber or open space is a vertical gate or plate 21 provided with wing extensions 22, 22 resting on the slides 23 arranged at the sides of the chamber 20. The gate 21 with the wing pieces 22, 22 together form an adjustable sliding gate adapted to control the amount of coffee which is to pass through the breakers. The position of the gate 21 will permit the coffee to be fed only to that portion of the breakers to the left of the gate (as viewed in Figs. 2 and 4) leaving that portion of the breakers to the right of the gate 21 inoperative. Attached to the wings 22, 22 of the gate 21 is a rod 24 projecting through a slot 25 in the front wall of the upper part of the casing 11. Attached to the rod 24 is a movable collar 26 yieldingly pressed inwardly by the spiral spring 27. The front end of the collar 26 is adapted to engage with depressions 28, 28 formed in the front wall of the casing 11 so that the gate 21 may be set in any one of a number of different positions. The opening of the hopper 10, indicated by 29, enters the chamber 20 on the upper side at the extreme left end (as viewed in Fig. 2) so that coffee is fed from the hopper 10 into the chamber 20 to the left of the gate 21. It is obvious that the position of the gate 21 will determine the length of the breakers which will be rendered operative and thus control the rate of feed of the broken coffee. In this manner, the finishing burrs which serve to cut or grind the broken and chaffed coffee, are never crowded, nor can the passageways to them become clogged. The sliding gate or regulator 21 may be moved to any desired position, corresponding to any desired grade to be produced by the finishing burrs into which the broken coffee is ultimately fed.

Where the opening 29 of the hopper 10 enters the casing 11 there is provided a sliding gate 30 which may be closed at will, to cut off the flow of coffee from the hopper 10, if desired.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a device of the character described; an elongated casing having a cylindrical breaker with longitudinal teeth rotatably mounted therein; a stationary breaker with longitudinal teeth arranged within said casing adjacent to and parallel with said rotatable breaker; said casing having formed therein a longitudinal chamber above said breakers and extending substantially the entire length thereof; said casing also provided with a feed opening entering one end of said chamber; said casing also provided with a discharge opening at the under side thereof; a hopper arranged above the casing and communicating with said feed opening; and a partition-like sliding gate arranged within said casing and adapted to substantially shut off from the feed opening a portion of said chamber in said casing above said breakers.

2. In a device of the character described; an elongated casing having therein a pair of longitudinally arranged breakers; said casing having formed therein a longitudinal chamber above said breakers and extending substantially the entire length thereof; said casing also provided with a feed opening entering one end of said chamber; said casing also provided with a discharge opening at the under side thereof; a hopper arranged above the casing and communicating with said feed opening; and a partition-like sliding gate arranged within said casing and adapted to substantially shut off from the feed opening a portion of said chamber in said casing above said breakers.

3. In a device of the character described; an elongated casing having therein a pair of elongated longitudinally arranged breakers; said casing having formed therein a longitudinal chamber above said breakers and extending substantially the entire length thereof; said casing also provided with a feed opening entering one end of said chamber; said casing also provided with a discharge opening at the under side thereof; a hopper arranged above the casing and communicating with said feed opening; and a partition-like sliding gate arranged within said casing and adapted to substantially shut off from the feed opening a portion of said chamber in said casing above said breakers.

4. In a device of the character described; an elongated casing having a cylindrical breaker with longitudinal teeth rotatably mounted therein; a stationary breaker with longitudinal teeth arranged within said casing adjacent to and parallel with said rotatable breaker; said casing having formed therein a longitudinal chamber above said breakers and extending substantially the entire length thereof; said casing also provided with a feed opening entering one end of said chamber; said casing also provided with a discharge opening at the under side thereof; a hopper arranged above the casing and communicating with said feed opening; a partition-like sliding gate arranged within said casing and adapted to substantially shut off from the feed opening a portion of said chamber in said casing above said breakers; and means for yieldingly holding said sliding gate in any one of a plurality of different positions.

Witness my hand this 21st day of July, A. D. 1924.

BERNARD M. ELY.